(12) United States Patent
Oh et al.

(10) Patent No.: US 8,536,765 B2
(45) Date of Patent: Sep. 17, 2013

(54) METHOD AND APPARATUS FOR UNLOCKING A PORTABLE TERMINAL USING PIEZOELECTRIC SENSORS

(75) Inventors: Jung Yeob Oh, Seongnam-si (KR); Seung Woo Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 653 days.

(21) Appl. No.: 12/558,825

(22) Filed: Sep. 14, 2009

(65) Prior Publication Data

US 2010/0090564 A1    Apr. 15, 2010

(30) Foreign Application Priority Data

Oct. 9, 2008  (KR) .................. 10-2008-0098962

(51) Int. Cl.
*H01L 41/00* (2013.01)
(52) U.S. Cl.
USPC ........................... 310/328; 310/314; 310/339
(58) Field of Classification Search
USPC ........................................... 310/314, 339, 328
See application file for complete search history.

(56) References Cited

U.S. PATENT DOCUMENTS

| | | | | |
|---|---|---|---|---|
| 5,825,675 | A * | 10/1998 | Want et al. ...................... | 708/142 |
| 6,330,457 | B1 * | 12/2001 | Yoon ........................... | 455/550.1 |
| 7,468,573 | B2 * | 12/2008 | Dai et al. ........................ | 310/317 |
| 2005/0048955 | A1 * | 3/2005 | Ring ............................ | 455/414.1 |
| 2006/0050059 | A1 * | 3/2006 | Satoh et al. ..................... | 345/173 |
| 2007/0259685 | A1 | 11/2007 | Engblom et al. | |
| 2008/0220752 | A1 | 9/2008 | Forstall et al. | |

FOREIGN PATENT DOCUMENTS

| | | |
|---|---|---|
| CN | 101047730 | 10/2007 |
| EP | 1 109 382 | 6/2001 |
| EP | 1 841 189 | 10/2007 |

OTHER PUBLICATIONS

European Search Report issued Feb. 1, 2010 by the European Patent Office in European Patent Application No. 09169955.3.
Office Action issued by the State Intellectual Property Office of the People's Republic of China associated with Chinese Patent Application No. 200910204906.4.

* cited by examiner

*Primary Examiner* — Thomas Dougherty
*Assistant Examiner* — Bryan Gordon
(74) *Attorney, Agent, or Firm* — H.C. Park & Associates, PLC

(57) ABSTRACT

The present invention relates to a method and apparatus for unlocking a portable terminal, and more particularly, to a method and apparatus for unlocking a portable terminal capable of canceling a hold state of the portable terminal without using a hold key. A portable terminal may include at least one piezoelectric sensor. When a squeeze operation signal is generated as pressure is applied to the at least one piezoelectric sensor, the hold state of the portable terminal is canceled.

12 Claims, 3 Drawing Sheets

METHOD AND APPARATUS FOR UNLOCKING A PORTABLE TERMINAL USING PIEZOELECTRIC SENSORS

CROSS REFERENCE TO RELATED APPLICATION

This application claims priority from and the benefit of Korean Patent Application No. 10-2008-0098962, filed on Oct. 9, 2008, which is hereby incorporated by reference for all purposes as if fully set forth herein.

BACKGROUND OF THE INVENTION

1. Field of the Invention

Exemplary embodiments of the present invention relate to a method and apparatus for unlocking a portable terminal.

2. Description of the Background

Generally, portable terminals are designed to perform multiple functions providing various services. Current portable terminals are capable of providing a variety of convenient services, which include call functions, text messaging, wireless internet connectivity, phonebook management, schedule planning, camera functions, video phone communications, sound recording, and/or MP3 player functions. Portable terminals may have an input unit to receive various commands to perform corresponding functions. Particularly, a portable terminal may have a function key or a shortcut key mounted thereon to perform a specific function. For example, a volume key, a camera key, and/or an MP3 key can be placed on a side of a portable terminal. The function keys or shortcut keys can perform an unintended function when the function keys or shortcut keys are unintentionally pressed, for example, in a pocket or a bag.

Recently, touch phones with touch screens have become widely used and an input unit in the touch phones has been removed to enhance design simplicity of a portable terminal. A portable terminal with a touch screen may also perform an unintended function when the touch screen is unintentionally touched, for example, in a pocket or in a bag. The probability to accidentally cause an unintended function can be increased depending on the type of phone, for example, a bar-type portable terminal. To solve this problem, a portable terminal may include a hold key so that no operation is performed even upon receiving an input from an input key, or upon detecting a touch on a touch screen unless a cancel hold signal is input. However, such a method may cause inconvenience to a user in using a portable terminal. For example, in case the user wants to make a phone call when the portable terminal is in a hold state, the user must cancel the hold state first and then press a shortcut key from a phonebook or enter a phone number the user would like to call. If the portable terminal is set up so that the hold state is canceled only when a particular key is pressed for a certain period of time, the user may experience more inconvenience. It is also inconvenient if the user has to cancel the hold state every time the user wants to use the portable terminal.

SUMMARY OF THE INVENTION

Exemplary embodiments of the present invention provide a method and apparatus for unlocking a portable terminal using a piezoelectric sensor. Exemplary embodiments of the present invention provide a piezoelectric sensor that can quickly cancel a hold state of the portable terminal and can prevent an unintentional execution of a function in the portable terminal.

Additional features of the invention will be set forth in the description which follows, and in part will be apparent from the description, or may be learned by practice of the invention.

Exemplary embodiments of the present invention disclose a portable terminal including at least one piezoelectric sensor and a controller. The at least one piezoelectric sensor is positioned on at least one side of the portable terminal, and is configured to generate a voltage difference when a pressure is applied on the at least one piezoelectric sensor. The controller cancels a hold state of the portable terminal in response to a squeeze operation signal. The squeeze operation signal is generated in response to the pressure being greater than or equal to a threshold level.

Exemplary embodiments of the present invention disclose a method of unlocking a portable device using a piezoelectric sensor. The method includes generating a squeeze operation signal in response to application of a pressure to at least one piezoelectric sensor. The pressure has a pressure level greater than a threshold level. The method includes canceling a hold state of the portable terminal in response to generation of the squeeze operation signal.

Exemplary embodiments of the present invention also disclose an apparatus including at least one piezoelectric sensor, a controller, and a display unit. The at least one piezoelectric sensor detects a pressure associated with a touch of a user of the apparatus. The controller is configured to operate the apparatus in a first mode and a second mode and to receive a first signal from the at least one piezoelectric sensor. The display unit receives, from the controller, an activation signal in response to the first signal. The controller, in response to receiving the first signal, cancels the first mode and executes a function in the second mode if the pressure is greater than a threshold value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
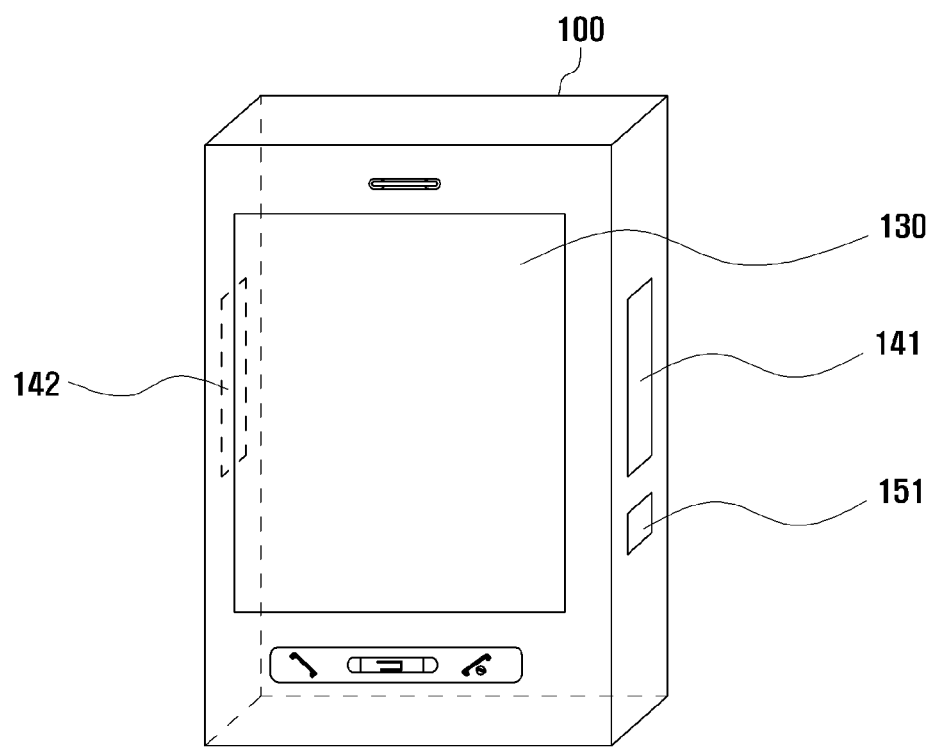
FIG. 1 illustrates a shape of a portable terminal according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portable terminal according to exemplary embodiments of the present invention will be described as a mobile communication terminal hereinafter. However, it should be noted that exemplary embodiments of the present invention are not limited to a mobile communication terminal, and may include any type of portable terminal having a lock function. For example, exemplary embodiments of the present invention can apply to all types of communication and information devices, multimedia devices, and the applications thereof such as a personal digital assistant (PDA), a smart phone, an international mobile telecommunication 2000 (IMT-2000), a code division multiple access (CDMA) portable terminal, a wideband code division multiple access (WCDMA) portable terminal, a global system for mobile communication (GSM) terminal, a general packet radio service (GPRS) portable terminal, an universal mobile telecommunication service (UMTS) terminal, and a digital broadcasting terminal.

Hereinafter, a portable terminal according to exemplary embodiments of the present invention may be described as a bar-type portable terminal. It should be understood that the exemplary embodiments are representative and do not limit the scope of the embodiments. Accordingly, any type of suitable portable terminal may be used, such as, for example, a folder-type or a slide-type portable terminal.

Hereinafter, exemplary embodiments of the present invention are described in detail with reference to the accompanying drawings.

FIG. 1 illustrates a portable terminal 100 according to exemplary embodiments of the present invention.

Referring to FIG. 1, a portable terminal 100 may include a display unit 130, a first piezoelectric sensor 141, a second piezoelectric sensor 142, and a hold key 151. The portable terminal 100 according to exemplary embodiments of the present invention may have a rectangular parallel-piped (e.g., bar-type) shape. When the display unit 130 is provided on a front side of the portable terminal 100, a first piezoelectric sensor 141 can be positioned on the right side of a body (hereinafter, referred to as "a first side") of the portable terminal 100, and a second piezoelectric sensor 142 can be positioned on a left side of the body (hereinafter, referred to as "a second side") of the portable terminal 100. The hold key 151 may be positioned on one side of the body. For example, in FIG. 1, the hold key 151 is illustrated to be positioned below the first piezoelectric sensor 141. However, in general, the hold key 151 may be positioned on any other part of the portable terminal 100 depending on the portable terminal designer's choice.

The hold key 151 may be a key for setting or canceling the locking state of the portable terminal 100. The hold key 151 may be formed as a slide-type switch, such that the portable terminal 100 may be in a locking state when the slide switch moves to one position, and in an unlocking state when the slide switch moves to another position. The hold key 151 may also be formed as a button-type key, so that a locking state can be entered when the button is pressed (downward), and an unlocking state can be entered when the button is re-pressed/released (upward). In some cases, the canceling of a locking state (i.e., unlock state) may be executed when the button (i.e., hold key) is pressed for a relatively longer period of time. In general, operation of the hold key 151 of the portable terminal 100 can be implemented in various ways depending on the designer's choice.

The first piezoelectric sensor 141 and the second piezoelectric sensor 142 may be used to enable quick canceling of the hold state of the portable terminal 100. A piezoelectric sensor may be a sensor having two opposing surfaces of electrode plates that are spaced apart from each other by a given interval. When either electrode plate is compressed or extended, a positive electric charge may occur in one electrode plate while a negative electric charge may occur in the other electrode plate, thereby generating a voltage difference across the electrode plates. The voltage difference between two electrode plates may be proportional to the applied pressure. Accordingly, the piezoelectric sensor can detect the pressure by checking the change in voltage difference between the two electrode plates.

The portable terminal 100 can cancel the hold state when a voltage difference is generated in at least one of the first piezoelectric sensor 141 and the second piezoelectric sensor 142 in response to a generated pressure. For example, when a user grasps the first piezoelectric sensor 141 and the second piezoelectric sensor 142 at the same time, the portable terminal 100 may turn the display unit 130 on and may perform a preset function. In some cases, the portable terminal 100 may display a function list that includes functions available in the portable terminal 100. The first and second piezoelectric sensors 141 and 142 may be positioned at a location where a user's finger can be expected to be placed when the user grasps the portable terminal 100. Accordingly, the first and second piezoelectric sensors 141 and 142 may be positioned based on the expected position of the user's fingers As noted above, the first piezoelectric sensor 141 and the second piezoelectric sensor 142 may be disposed on the left and the right sides of the portable terminal 100. In general, the portable terminal 100 may include one or more piezoelectric sensors which may be located at any suitable location on the portable terminal 100.

Figure 2:
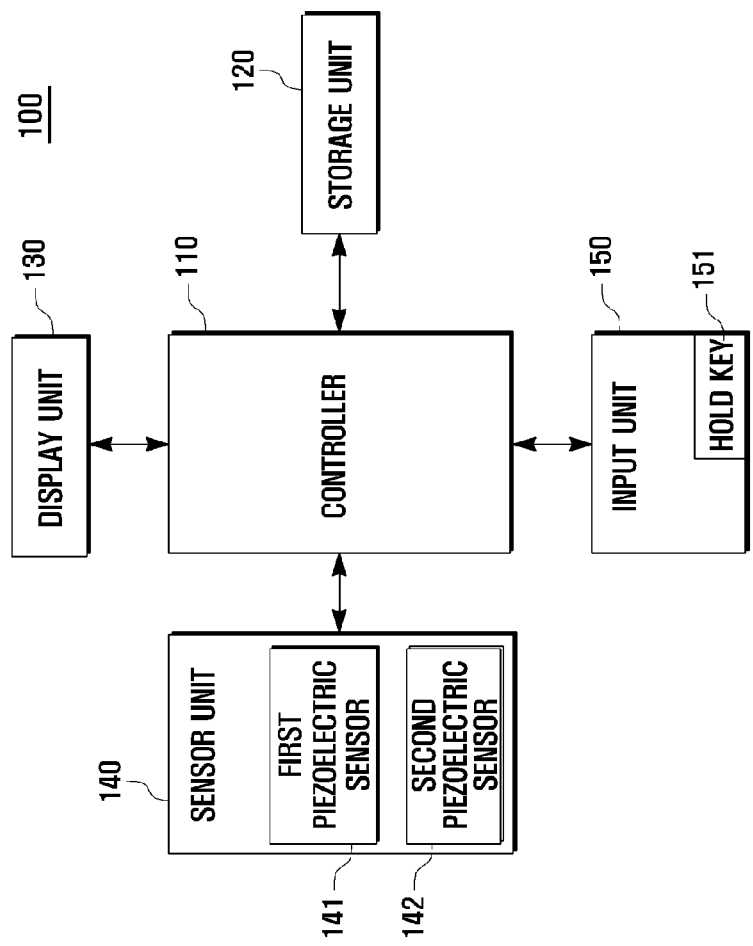
FIG. 2 is a block diagram illustrating a schematic configuration of a portable terminal according to exemplary embodiments of the present invention.

FIG. 2 is a block diagram illustrating a schematic configuration of a portable terminal according to exemplary embodiments of the present invention.

Referring to FIG. 2, the portable terminal 100 may include a display unit 130, a controller 110, a storage unit 120, a sensor unit 140, and an input unit 150. The input unit 150 may include the hold key 151, and the sensor unit 140 may include the first piezoelectric sensor 141 and the second piezoelectric sensor 142.

The input unit 150 may include a plurality of input keys and function keys to receive numeral information or character information, and may perform various functions. The function keys may include an arrow key, a side key, and a shortcut key that is designed to perform a specific function. For example, the input unit 150 may include a function key for activating a digital broadcast mode and a function key for selecting or moving to a specific channel. The input unit 150 may also include a hold key 151. The hold key 151 may be used to set the portable terminal 100 to a locking state or to cancel the locking state. The hold key 151 can be designed in various ways according to the designer's choice as described above.

The sensor unit 140 may include a sensor for canceling the hold state of the portable terminal 100. The sensor unit 140 may include one or more piezoelectric sensors. For example, the sensor unit 140 may include the first piezoelectric sensor 141 and the second piezoelectric sensor 142.

The first piezoelectric sensor 141 may be positioned on a first side of the portable terminal 100, and the second piezoelectric sensor 142 may be positioned on a second side, opposite to the first side, of the portable terminal 100. The first piezoelectric sensor 141 and the second piezoelectric sensor 142 may transmit a signal generated when the user grasps the portable terminal 100. For example, when a squeeze operation is performed, the controller 110 may cancel the locking state of the portable terminal 100. An output signal from the first piezoelectric sensor 141 and the second piezoelectric sensor 142 indicating execution of the squeeze operation may be transmitted to an interrupt terminal or general purpose input/output (GPIO) terminal of the controller 110.

Two piezoelectric sensors may be used to prevent the portable terminal 100 from unintentionally canceling the hold state. For example, the portable terminal 100 can cancel the hold state only when both the two piezoelectric sensors simultaneously generate the output signal. If only one of the first piezoelectric sensor 141 and the second piezoelectric sensor 142 is pressed, for example, in a pocket or in a bag of the user, the portable terminal 100 may not cancel the hold state. Accordingly, although the apparatus for controlling the hold state of the portable terminal 100 may be implemented by using one piezoelectric sensor, at least two piezoelectric sensors may be used to reduce the probability of an unintentional execution of a function related to canceling the hold state.

The storage unit 120 can store user data and/or programs needed to perform various services. The storage unit 120 can include a program area and a data area.

The program area may store a program for controlling operation of the portable terminal 100, an operating system (OS) that boots the portable terminal 100, an application program needed to reproduce multimedia contents, and/or an application program needed to perform an optional function of the portable terminal 100, such as, for example, a camera function, a sound reproducing function, and an image or video reproducing function. The program area may store a program for canceling the hold state of the portable terminal 100 and for performing a predefined function when pressure is applied to the first piezoelectric sensor 141 and the second piezoelectric sensor 142 at the same time, (e.g., when the user performs the squeeze operation). The predefined function can include a display of a quick launcher where a shortcut icon for a particular function is displayed, or entering a 'draw & go' mode in which the user can select a diagram displayed on the display unit 130 to perform a corresponding function. The predefined function may also include a picture viewer function and/or a function to enter a phone call mode. The program area may store a function selecting menu program for allowing a user to select a function to be performed upon generation of a squeeze operation signal.

The data area in the storage unit 120 may be an area for storing data generated by the use of the portable terminal 100. The data area may, for example, store phone directory data, audio data, and contents or information corresponding to user data. The data area may store a function to be performed in response to the canceling of the hold state of the portable terminal 100 when a squeeze operation is performed. The function to be performed upon the canceling of the hold state can be a function selected and stored by the user, a function that is the most frequently used by the user during a certain period of time (e.g., one week), or a function that was most recently performed by the user. The data area may also store a usage history for each function of the portable terminal 100, and the usage history may be used to indicate and execute the function that was most recently performed.

The display unit 130 can display, for example, a menu screen of the portable terminal 100, user data input by the user, system-setting information, or various types of information to be provided to the user. The display unit 130 can be implemented using a liquid crystal display (LCD) or organic light emitting diodes (OLED). When the display unit 130 is implemented with a touch screen, the display unit 130 may function as an input means. In some cases, the display unit 130 may display an executed icon of a predefined function when pressure is simultaneously applied to the first piezoelectric sensor 141 and the second piezoelectric sensor 142 (i.e., a squeeze operation is performed). In some cases, the display unit 130 may display a function list that lists functions available in the portable terminal 100.

The controller 110 may control an overall operation of the portable terminal 100, a signal flow among internal components of the portable terminal 100, and data processing of the portable terminal 100. The controller 110 may not perform any operation if a locking state is set up by the hold key 151 even if an input signal may be generated through the input unit 150 or the touch screen. The controller 110 may detect the squeeze operation, and upon detection of the squeeze operation, in some cases, may turn the display unit 130 on so that a predefined function may be performed. In some cases, the controller 110 may instruct the display unit 130 to display a function list that lists functions available in the portable terminal 100 on the display unit 130. The controller 110 may also turn the display unit 130 of the portable terminal 100 off, and may enter into a hold state if an input signal has not been generated for a certain period of time. The controller 110 may receive an input signal from the first piezoelectric sensor 141 and the second piezoelectric sensor 142 according to a voltage difference generated therein, as described hereinabove. The controller 110 may determine that the squeeze signal is generated only when a signal according to the voltage difference has a level greater than or equal to a threshold level. That is, if the user grips the portable terminal 100 without sufficient hand strength, the hold state of the portable terminal 100 may not be canceled.

As described above, at least one piezoelectric sensor mounted on the body of the portable terminal 150 may be used instead of the hold key 151 of the input unit 150, so that the hold state can be canceled with ease and promptness by applying pressure to the at least one piezoelectric sensor (i.e., by performing a squeeze function). In addition, a specific function set by the user may be performed upon execution of the squeeze operation, so that a desired function can be performed promptly after the hold state. If two piezoelectric sensors are operated, the two piezoelectric sensors may generate a signal when pressurized at the same time, thereby preventing unintentional cancellation of the hold state.

Although not shown in the drawings, the portable terminal 100 may further include a camera module for capturing images or recording videos, a broadcast receiving module for receiving broadcast data, an audio signal output device such as a speaker, a voice signal input unit such as a microphone, and/or a digital sound source reproducing module such as an MP3. Such additional components can be varied in form and in structure. In general, the portable terminal 100 may further include any element equivalent to the components mentioned above, and any other suitable, compatible component.

Figure 3:
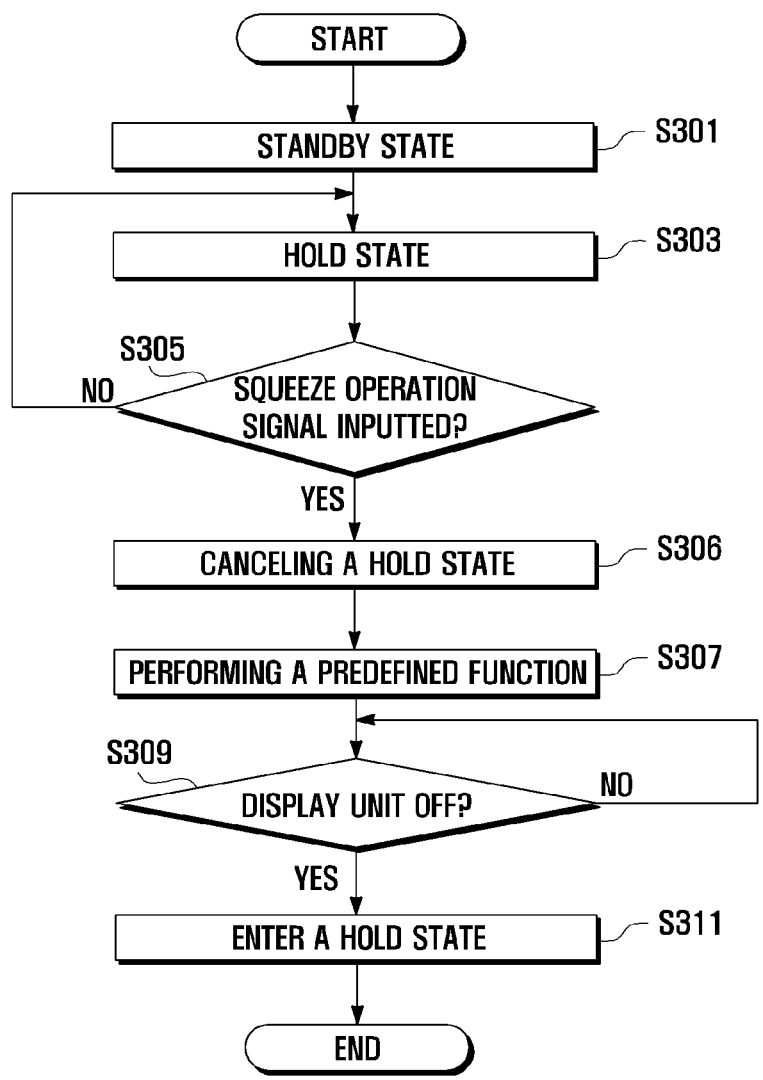
FIG. 3 is a flowchart illustrating a method of canceling a hold state of a portable terminal by using a piezoelectric sensor according to exemplary embodiments of the present invention.

FIG. 3 is a flowchart illustrating a method of canceling a hold state of a portable terminal by using a piezoelectric sensor according to exemplary embodiments of the present invention.

Referring to FIG. 3, the portable terminal 100 can enter a standby state after being provided power and being booted up (S301). Then, the controller 110 can enter a hold state (S303). For example, the hold state can be set up by a user using/pressing a hold key. In some cases, the controller 110 can be set to enter a locking state automatically when the portable terminal 100 is not used for a given period of time.

Then, the controller 110 may determine whether a squeeze operation signal is input (S305). For example, the portable terminal 100 may include at least one piezoelectric sensor positioned on at least one side of the portable terminal 100. In some cases, as illustrated in FIG. 1, the portable terminal 100 may have a first piezoelectric sensor on one side of the portable terminal 100 and a second piezoelectric sensor on the other side. If the portable terminal 100 includes two piezoelectric sensors, generation of the squeeze operation signal may refer to a situation where both the first piezoelectric sensor 141 and the second piezoelectric sensor 142 are under a pressure that is greater than or equal to a threshold level.

If the squeeze operation signal is not input at step S305, the controller 110 may return to step S303 to maintain the hold state. If the squeeze operation signal is input at step S305, the controller 110 can cancel the hold state of the portable terminal 100 (S306). Then, the controller 110 can perform a function set up by the user/designer's choice (S307). In some cases, the controller 110 may perform a function that has been performed most recently or a function that is the most frequently performed according to the usage history stored in the storage unit 120. In some cases, upon cancellation of the locking state of the portable terminal 100, the controller 110 can display a function list that lists functions available in the portable terminal 100, and/or can perform a specific function through a menu screen. Accordingly, user convenience may be enhanced.

The controller 110 can determine whether a signal is not input for a certain period of time and may keep the display unit 130 turned off if no signal has been input (S309). For example, the controller may control or terminate power supplied to the display unit 130 to turn it off. If the display unit 130 is not determined to be turned off at step S309, the controller 110 can maintain step S309 to check if the display unit 130 is turned off. If the display unit 130 is determined to be turned off at step S309, the controller 110 can set the portable terminal 100 in a hold state (S311).

The method and the apparatus for unlocking a portable terminal 100 according to exemplary embodiments of the present invention can immediately perform a predefined function while canceling a hold state without use of a hold key. Accordingly, user convenience may be improved. Also, by using a piezoelectric sensor, unintentional cancellation of a hold state of a portable terminal 100, which can be caused by pressing the hold key in a pocket or in a bag, may be prevented. When using a plurality of piezoelectric sensors, a hold state may be canceled when all the plurality of piezoelectric sensors generate a signal at the same time. Furthermore, exemplary embodiments of the present invention allow a user to set up a specific function which is performed upon canceling a hold state. Accordingly, a user can perform the function which is most frequently used in the shortest time.

As described hereinabove, a predefined function may be performed when a hold state is canceled upon execution of a squeeze operation in the hold state. However, a predefined function can also be performed upon execution of the squeeze operation in a non-hold state.

A method and an apparatus for controlling a hold state of a portable terminal using a piezoelectric sensor was described hereinabove. It will be apparent to those skilled in the art that various modifications and variations can be made in the present invention without departing from the spirit or scope of the invention. Thus, it is intended that exemplary embodiments of the present invention cover the modifications and variations of this invention provided they come within the scope of the appended claims and their equivalents.

What is claimed is:

1. A portable terminal, comprising:
   at least one piezoelectric sensor positioned on at least one side of the portable terminal and configured to provide a voltage difference when a pressure is applied on the at least one piezoelectric sensor;
   a storage unit to store a usage history for each function of the portable terminal; and
   a controller to cancel a hold state of the portable terminal in response to a squeeze operation signal and to execute one of a function performed most recently and a function most frequently performed during a determined period of time based on the usage history, the squeeze operation signal being provided in response to the pressure being greater than or equal to a threshold level,
   wherein the squeeze operation signal is not provided in response to a contact being detected by the at least one piezoelectric sensor and the pressure being less than the threshold level.

2. The portable terminal of claim 1, wherein the at least one piezoelectric sensor comprises:
   a first piezoelectric sensor positioned on a first side of the portable terminal; and
   a second piezoelectric sensor positioned on a second side of the portable terminal.

3. The portable terminal of claim 2, wherein the controller is configured to cancel the hold state of the portable terminal if the pressure is simultaneously applied to the first piezoelectric sensor and the second piezoelectric sensor.

4. The portable terminal of claim 1, wherein the controller is configured to terminate power supplied to a display unit of the portable terminal and to set the portable terminal to the hold state if an input signal is not received for a determined period of time.

5. The portable terminal of claim 1, wherein the controller is configured to cancel the hold state if the squeeze operation signal is input, and to set the portable terminal to the hold state if the squeeze operation signal is not input.

6. A method of unlocking a portable device using a piezoelectric sensor, the method comprising:
   providing a squeeze operation signal in response to a pressure applied to at least one piezoelectric sensor, the pressure being greater than or equal to a threshold level;
   canceling a hold state of the portable terminal in response to the squeeze operation signal being provided; and
   performing one of a function performed most recently and a function most frequently performed during a determined period of time based on a previously stored usage history for each function of the portable terminal, wherein the squeeze operation signal is not provided in response to a contact being detected by the at least one piezoelectric sensor and the pressure being less than the threshold level.

7. The method of claim 6, further comprising:
positioning a first piezoelectric sensor on a first side of the portable terminal; and
positioning a second piezoelectric sensor on a second side of the portable terminal.

8. The method of claim 7, wherein the squeeze operation signal is provided when the pressure is simultaneously applied to the first piezoelectric sensor and the second piezoelectric sensor.

9. The method of claim 6, further comprising one of:
canceling the hold state of the portable terminal if the squeeze operation signal is input, and setting the portable terminal to the hold state if the squeeze operation signal is not input; and
setting the portable terminal to the hold state if an input signal is not received for a determined period of time.

10. An apparatus, comprising:
at least one piezoelectric sensor to detect an input pressure;
a storage unit to store a usage history for each function of the portable terminal;
a controller to operate the apparatus in a first mode and a second mode and to receive a first signal from the at least one piezoelectric sensor; and
a display unit to receive, from the controller, an activation signal in response to the first signal,
wherein, in response to receiving the first signal, the controller is configured to cancel the first mode and to execute one of a function performed most recently and a function most frequently performed during a determined period of time based on the usage history in the second mode, the first signal being provided in response to the input pressure being greater than or equal to a threshold value, and
wherein the first signal is not provided in response to a contact being detected by the at least one piezoelectric sensor and the input pressure being less than the threshold value.

11. The apparatus of claim 10, wherein the at least one piezoelectric sensor comprises:
a first piezoelectric sensor on a first side of the apparatus; and
a second piezoelectric sensor on a second side of the apparatus, the second side being situated on an opposite side of the apparatus relative to the first side, and
wherein the input pressure is applied simultaneously to the first piezoelectric sensor and the second piezoelectric sensor.

12. The apparatus of claim 10, wherein the first mode comprises a hold mode of the apparatus and the second mode comprises an active mode of the apparatus,
wherein, in the hold mode, the controller is configured not to respond to an input other than the input pressure,
wherein, in the active mode, the controller is configured to execute a function, and
wherein if the input pressure is less than the threshold value, the controller is configured to operate in the first mode, and
wherein, if no user input is detected and the display unit is not activated for a determined period of time, the controller is configured to operate in the first mode.

* * * * *

UNITED STATES PATENT AND TRADEMARK OFFICE
CERTIFICATE OF CORRECTION

PATENT NO. : 8,536,765 B2  
APPLICATION NO. : 12/558825  
DATED : September 17, 2013  
INVENTOR(S) : Oh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this
Seventeenth Day of February, 2015

Michelle K. Lee
*Deputy Director of the United States Patent and Trademark Office*